(12) United States Patent
Tsukamoto

(10) Patent No.: US 7,397,516 B2
(45) Date of Patent: Jul. 8, 2008

(54) TELEVISION BROADCAST RECEIVER

(75) Inventor: Keisuke Tsukamoto, Daito (JP)

(73) Assignee: Funai Eletric Co., Ltd., Daito-shi (JP)

( * ) Notice: Subject to any disclaimer, the term of this patent is extended or adjusted under 35 U.S.C. 154(b) by 568 days.

(21) Appl. No.: 11/175,215

(22) Filed: Jul. 7, 2005

(65) Prior Publication Data
US 2006/0020986 A1      Jan. 26, 2006

(30) Foreign Application Priority Data
Jul. 8, 2004     (JP) .............................. 2004-201706

(51) Int. Cl.
*H04N 5/50* (2006.01)
(52) U.S. Cl. .................................................. 348/725
(58) Field of Classification Search ................. 348/725, 348/731, 732, 553, 570; 455/179.1; 725/131, 725/139, 151
See application file for complete search history.

(56) References Cited

U.S. PATENT DOCUMENTS 5,729,825 A * 3/1998 Kostreski et al. ............... 725/62
6,006,069 A * 12/1999 Langston ...................... 455/62
6,069,564 A * 5/2000 Hatano et al. ............. 340/572.7
6,101,174 A * 8/2000 Langston ..................... 370/312
6,112,056 A * 8/2000 Langston ...................... 455/62

FOREIGN PATENT DOCUMENTS

JP       2000-156605 A     6/2000
JP       2001-119336 A     4/2001

* cited by examiner

*Primary Examiner*—Paulos M Natnael
(74) *Attorney, Agent, or Firm*—Crowell & Moring, LLP

(57) ABSTRACT

A TV receiver comprises: a tuner connected to a unidirectional antenna or a smart antenna; a reception control unit for outputting, to the tuner, a channel control signal to command a channel, and outputting, to the smart antenna, a receiving direction control signal to command a receiving direction; and an antenna selection switch for a user to select the either antenna. The reception control unit switches its control mode between a unidirectional antenna mode and a smart antenna mode. In the unidirectional antenna mode, the reception control unit outputs a channel control signal to the tuner. In the smart antenna mode, the reception control unit outputs the channel control signal and the receiving direction control signal to the tuner and the smart antenna, respectively, for controlling the TV signal reception. This TV receiver can properly switch the antenna control mode, depending on the kind of antenna selected by the user.

4 Claims, 16 Drawing Sheets

CHANNEL INFORMATION TABLE

| CHANNEL NO. | REGISTER FLAG | BEST DIRECTION |
|---|---|---|
| 1 |  | 2 |
| 2 | ○ | 3 |
| 3 | ○ | 9 |
| 4 |  | 15 |
| 5 | ○ | 8 |
| ⋮ | ⋮ | ⋮ |
| 129 | ○ | 9 |

CHANNEL INFORMATION TABLE

| CHANNEL NO. | REGISTER FLAG |
|---|---|
| 1 |  |
| 2 |  |
| 3 | ○ |
| 4 |  |
| 5 | ○ |
| ⋮ | ⋮ |
| 129 | ○ |

51  53

TELEVISION BROADCAST RECEIVER

BACKGROUND OF THE INVENTION

1. Field of the Invention

The present invention relates to a television broadcast receiver for receiving terrestrial broadcasts.

2. Description of the Related Art

Conventionally, directional antennas such as a Yagi antenna are used to receive terrestrial broadcasts. A directional antenna has a high directivity to be able to receive a weak radio wave or signal. At the same time, the directional antenna has a drawback that it can receive only a radio wave coming from one direction. This is not a big problem in countries like Japan where many broadcast towers are concentrated in one location. However, in countries like the United States of America, there are many areas where broadcast towers spread around cities. If a directional antenna such as a Yagi antenna is used in such case, it may occur that the directional antenna cannot receive many broadcasts from broadcast towers even if the directional antenna is placed close to the broadcast towers.

In order to solve such problem, the EIA (Electronic Industries Association)-909 standard "Antenna Control Interface" was instituted, which provides a technology that a television broadcast receiver can control and change receiving directions of the antenna. More specifically, it is a standard to connect, to a television broadcast receiver, a so-called smart antenna which is capable of changing its receiving directions, and to control the antenna by the television broadcast receiver via a modular terminal. In the present specification, the two kinds of antennas are distinguished by referring to the directional antenna, such as the Yagi antenna, as a unidirectional antenna, and by referring to the antenna, capable of changing its receiving directions, as a multi-directional antenna.

There is a possibility that a unidirectional antenna is connected to a television broadcast receiver, to which a multi-directional antenna should be connected. However, there is no known television broadcast receiver for receiving terrestrial broadcasts that allows a user to optionally select the kind of antenna connected to the television broadcast receiver, or that can properly switch antenna control modes depending on the kind of antenna connected to the television broadcast receiver. Thus, even if a unidirectional antenna is connected to a television broadcast receiver capable of controlling a multi-directional antenna, there is a possibility that the television broadcast receiver may perform a control operation for a multi-directional antenna, which is meaningless for the connected unidirectional antenna.

For example, some of such television broadcast receivers have an omni-directional scanning function to sequentially command all the receiving directions of a multi-directional antenna for an arbitrary channel selected by a user, and to automatically determine a receiving direction, which enables television broadcast signal reception in a best receiving condition for the channel, on the basis of e.g. signal intensities of a television broadcast signal of the channel in all the receiving directions. Such receiving direction to enable the best receiving condition is referred to as best receiving direction in the present specification.

This omni-directional scanning process is a completely unnecessary process for a unidirectional antenna, which is incapable of changing its receiving direction. The omni-directional scanning process, when performed for the unidirectional antenna, is a waste of time. Accordingly, it is necessary or desired to perform the omni-directional scanning process only in the case where the television broadcast receiver is connected to the multi-directional antenna.

SUMMARY OF THE INVENTION

An object of the present invention is to provide a television broadcast receiver for receiving terrestrial broadcasts that allows a user to optionally select the kind of antenna to be used, whether a multi-directional antenna or a unidirectional antenna, and that can properly switch antenna control modes depending on the kind of antenna selected by the user.

According to a first aspect of the present invention, we provide a television broadcast receiver connected to a unidirectional antenna having a single receiving direction, or to a multi-directional antenna having a predetermined number of receiving directions, for receiving television broadcast signals in respective channels transmitted from broadcast stations, the television broadcast receiver comprising: a tuner connected to the unidirectional antenna or the multi-directional antenna for receiving a television broadcast signal; a reception control unit for outputting, to the tuner, a channel control signal to command a channel to be selected, and for outputting, to the multi-directional antenna, a receiving direction control signal to command a receiving direction for receiving the television broadcast signal, so as to control a reception process of receiving the television broadcast signal; and an antenna selection switch to be operated by a user for selecting either the unidirectional antenna or the multi-directional antenna to be connected to the tuner.

The reception control unit switches a control mode between a unidirectional antenna control mode and a multi-directional antenna control mode in a manner that if the unidirectional antenna is selected using the antenna selection switch, the reception control unit switches the control mode to the unidirectional control mode in which the reception control unit outputs the channel control signal to the tuner for controlling the reception of the television broadcast signal, while if the multi-directional antenna is selected using the antenna selection switch, the reception control unit switches the control mode to the multi-directional antenna control mode in which the reception control unit outputs the channel control signal and the receiving direction control signal to the tuner and the multi-directional antenna, respectively, for controlling the reception of the television broadcast signal.

According to a second aspect of the present invention, we provide a television broadcast receiver connected to a unidirectional antenna having a single receiving direction, or to a multi-directional antenna having a predetermined number of receiving directions, for receiving television broadcast signals in respective channels transmitted from broadcast stations, the television broadcast receiver comprising: a tuner connected to the unidirectional antenna or the multi-directional antenna for receiving a television broadcast signal; a reception control unit for outputting, to the tuner, a channel control signal to command a channel to be selected, and for outputting, to the multi-directional antenna, a receiving direction control signal to command a receiving direction for receiving the television broadcast signal, so as to control a reception process of receiving the television broadcast signal; and an antenna selection unit for outputting, to a monitor, an antenna selection image for a user to select either the multi-directional antenna or the unidirectional antenna to be connected to the tuner so as to accept input of antenna selection by the user, and for further setting the antenna selected by the user as the antenna to be connected to the tuner.

The reception control unit switches a control mode between a unidirectional antenna control mode and a multi-directional antenna control mode in a manner that if the unidirectional antenna is selected by the antenna selection unit, the reception control unit switches the control mode to the unidirectional control mode in which the reception control unit outputs a channel control signal to the tuner for controlling the reception of the television broadcast signal, while if the multi-directional antenna is selected by the antenna selection unit, the reception control unit switches the control mode to the multi-directional antenna control mode in which the reception control unit outputs the channel control signal and the receiving direction control signal to the tuner and the multi-directional antenna, respectively, for controlling the reception of the television broadcast signal.

The television broadcast receiver according to the present invention makes it possible for a user to optionally select either one of the multi-directional antenna and the unidirectional antenna as the kind of antenna to be used, and also makes it possible to properly switch the antenna control mode, depending on the kind of antenna selected by the user.

While the novel features of the present invention are set forth in the appended claims, the present invention will be better understood from the following detailed description taken in, conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 8A is a schematic view showing an example of a channel information table created by the all-channel omni-directional scanning process, while FIG. 8B is a schematic view showing an example of a channel information table created by an all-channel unidirectional scanning process performed by the TV broadcast receiver;

FIG. 16A and FIG. 16B are schematic views showing modified examples of the TV broadcast receiver, in which FIG. 16A is a schematic front view of the TV broadcast receiver, while FIG. 16B is a schematic top plan view of a remote control used for the TV broadcast receiver.

DESCRIPTION OF THE PREFERRED EMBODIMENTS

Figure 1:
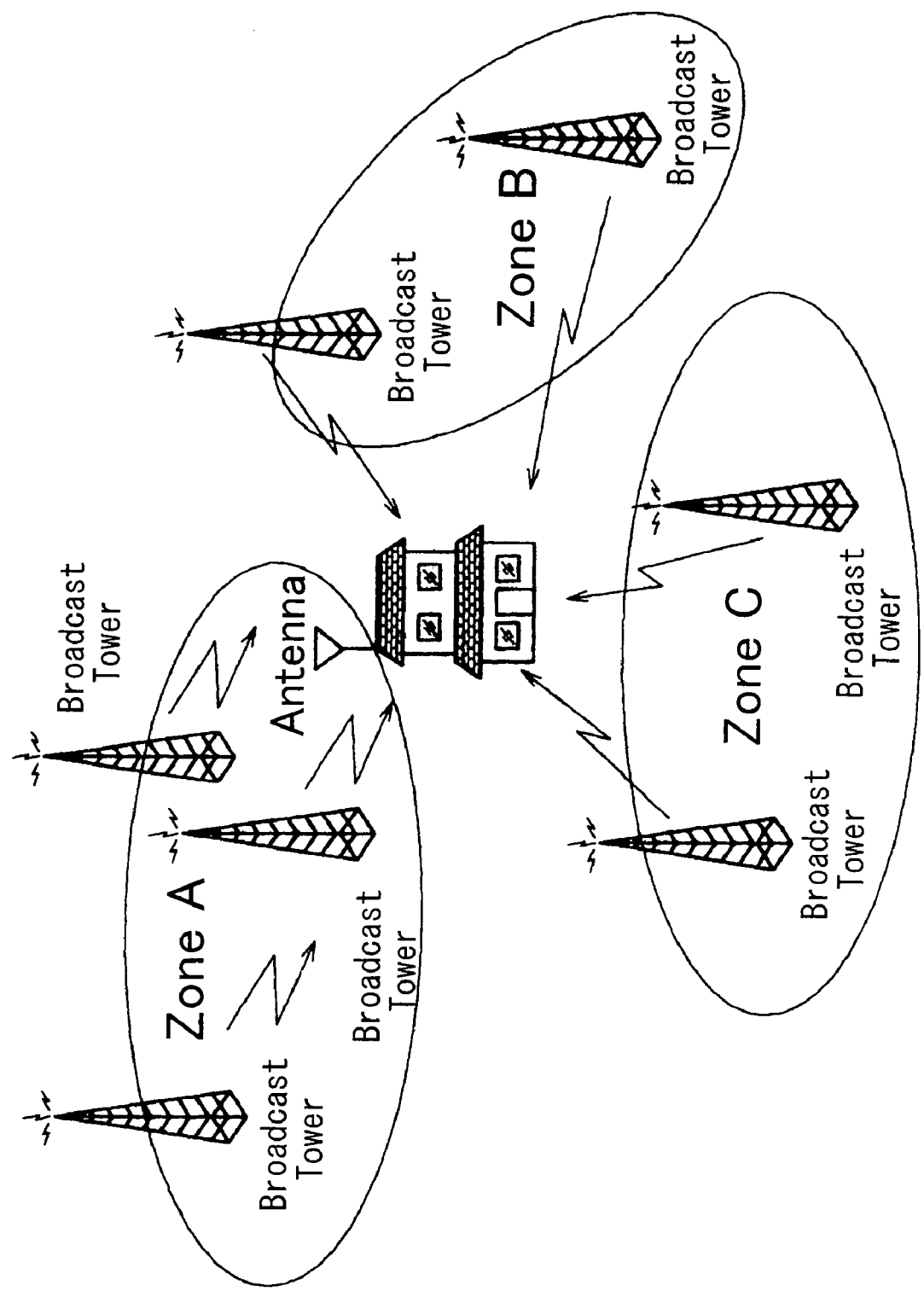
FIG. 1 is a schematic view showing a situation in which a TV (television) broadcast receiver in a general home of a user receives digital TV broadcast signals from broadcast towers located in various zones.

The best modes and preferred embodiments of the present invention will be described hereinafter with reference to the annexed drawings. Note that the specific embodiments described are not intended to cover the entire scope of the present invention, and hence the present invention is not limited to only the specific embodiments. Also note that like parts are designated by like reference numerals throughout the drawings.

FIG. 1 is a schematic view showing a situation in which a television broadcast receiver in a general home of a user receives digital television (TV) broadcast signals (hereafter referred to simply as "TV broadcast signals") of broadcast stations transmitted from broadcast towers located in various zones. Generally, if a TV broadcast receiver receives TV broadcast signals which have signal intensity equal to or higher than a predetermined threshold value, it is possible to obtain images of a certain quality or higher, using error correction and the like. Here, it is assumed that as shown in FIG. 1, the TV broadcast receiver in the home of the user can receive TV broadcast signals transmitted from broadcast towers spreading across multiple locations e.g. in zone A, zone B and zone C, thereby making it possible to view TV programs from the broadcast stations. A multi-directional antenna, called a smart antenna, having multiple receiving directions is put to practical use for such situation.

Figure 2:
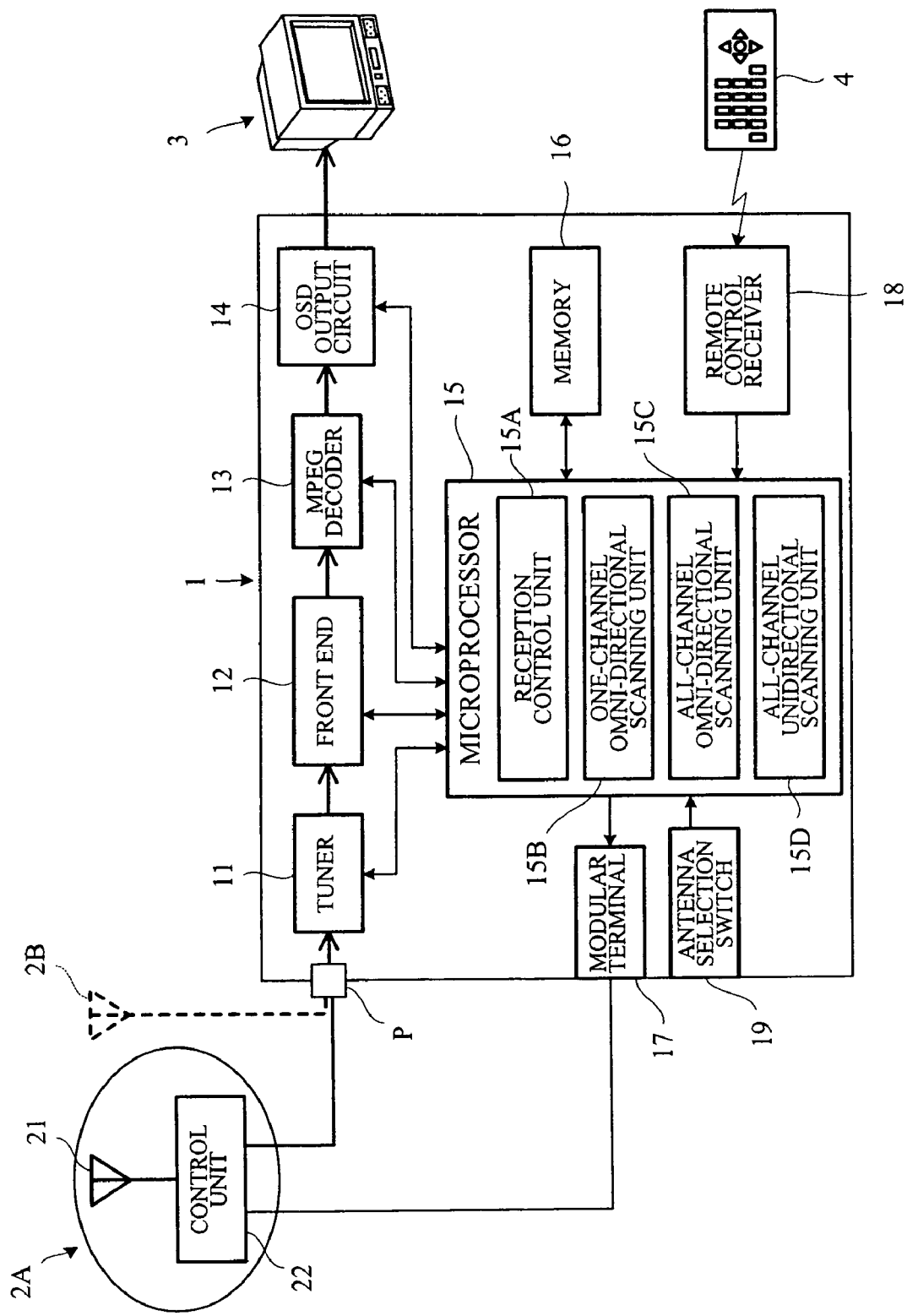
FIG. 2 is a schematic block diagram showing a TV broadcast receiver according to a first embodiment of the present invention.

FIG. 2 is a schematic block diagram showing a TV broadcast receiver 1 according to a first embodiment of the present invention. Referring to FIG. 2, the TV broadcast receiver 1 comprises a tuner 11 connected to a smart antenna (multi-directional antenna) 2A, having an antenna unit 21 and a control unit 22, via a plug P or a unidirectional antenna 2B (shown by dotted line) having a single receiving direction such as a Yagi-antenna via the plug P for receiving a TV broadcast signal. When the control unit 22 of the smart antenna 2A is plugged in the plug P by e.g. a user, the control unit 22 is connected via the plug P to the tuner 11, while when the unidirectional antenna 2B is plugged in the plug P by e.g. the user, the unidirectional antenna 2B is connected via the pug P to the tuner 11. The present embodiment is based on an assumption that either the smart antenna 2A or the unidirectional antenna 2B is connected to the tuner 11 by e.g. the user via the plug P.

When the TV broadcast receiver 1 is connected to the smart antenna 2A having multiple receiving directions, the TV broadcast receiver 1 switches an active receiving direction of the smart antenna 2A (namely, makes one of the multiple receiving directions of the smart antenna 2A active) so as to receive a TV broadcast signal transmitted in a given frequency band from one of the broadcast towers spreading across the multiple locations, and to output a TV program contained in the TV broadcast signal in each channel to a monitor 3. Note that in the present embodiment, a physical channel that is a frequency band of carrier wave used for a TV program is referred to simply as "channel".

The TV broadcast receiver 1 further comprises: a front end 12 for subjecting the TV broadcast signal received by the tuner 11 to predetermined signal processing, and decoding the received TV broadcast signal; an MPEG (Motion Picture Experts Group) decoder 13 for decoding the TV broadcast signal which is an MPEG-compressed signal; an on-screen display (OSD) output circuit 14 for superimposing a signal of a predetermined display image on the decoded TV broadcast signal to produce a combined signal and outputting the combined signal to the monitor 3; a microprocessor 15 for controlling the entire TV broadcast receiver 1 on the basis of predetermined programs; a memory 16 for storing a channel information table; a modular terminal 17 connected to a modular cable for outputting control signals (e.g. later described receiving direction control signal); a remote control receiver 18 for receiving signals sent from a remote control 4 and outputting the received signals to the microprocessor 15; an antenna selection switch 19 for a user to select one of the smart antenna 2A and the unidirectional antenna 2B as an antenna connected to the tuner 11; and so on.

As will also be described later with reference to FIG. 8A, the channel information table stored in the memory 16 is provided to contain: channel numbers of respective channels transmitted from the broadcast stations via the broadcast towers; best receiving directions of the smart antenna 2A for receiving TV broadcast signals of the respective channels; and registration flags indicating whether the respective channels are registered as selectable channels, or registered as non-selectable channels. Based on the registration flags, the microprocessor 15 performs a reception process for receiving TV broadcast signals of the channels which are registered therein as the selectable channels. In the descriptions below, the state where a channel is registered as a selectable channel is referred to as "on-state of registration flag" or "registration flag on", while the state where a channel is registered as a non-selectable channel is referred to as "off-state of registration flag" or "registration flag off".

The microprocessor 15 comprises:

a reception control unit 15A for outputting, to the tuner 11, a channel control signal to command selection of a channel, and further outputting, to the smart antenna 2A via the modular terminal 17, a receiving direction control signal to command a receiving direction for receiving a TV broadcast signal, so as to control an operation of the TV broadcast receiver 1 to receive the TV broadcast signal;

a one-channel omni-directional scanning unit 15B for performing a one-channel omni-directional scanning process which includes commanding the reception control unit 15A to sequentially output, to the smart antenna 2A via the modular terminal 17 when selected using the antenna selection switch 19, the receiving direction control signal so as to sequentially command the respective or all the receiving directions of the smart antenna 2A, and which further includes commanding the tuner 11 to sequentially receive TV broadcast signals in the respective or all the receiving directions for arbitrary one channel transmitted from a broadcast station so as to determine a best receiving direction and channel registration information for the one channel on the basis of signal intensities of the TV broadcast signals in the respective or all the receiving directions, and renew a channel information table on the basis of the determined best receiving direction and channel registration information;

an all-channel omni-directional scanning unit 15C for commanding the one-channel omni-directional scanning unit 15B to repeat the one-channel omni-directional scanning process for respective or all channels transmitted from broadcast stations, when the smart antenna 2A is selected using the antenna selection switch 19, so as to determine a best receiving direction and channel registration information for each of the respective or all the channels, and renew the channel information table on the basis of the determined best receiving direction and channel registration information; and an all-channel unidirectional scanning unit 15D for commanding the reception control unit 15A to sequentially output, to the tuner 11, the channel control signal so as to sequentially command selection of the respective or all the channels from the broadcast stations, and further for commanding the tuner 11 to sequentially receive TV broadcast signals of the respective or all the channels, when the unidirectional antenna 2B is selected using the antenna selection switch 19, so as to determine channel registration information for each of the respective or all the channels, and renew the channel information table on the basis of the determined channel registration information.

Figure 3:
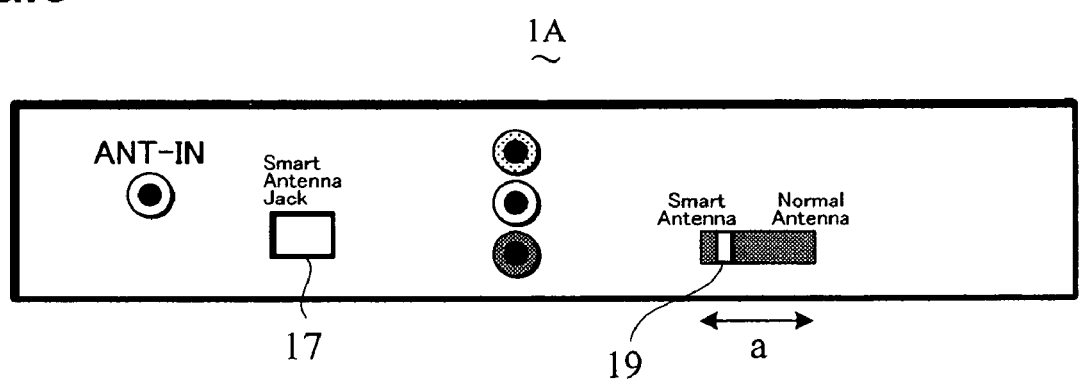
FIG. 3 is a schematic rear view of the TV broadcast receiver.

FIG. 3 is a rear view of the TV broadcast receiver 1 according to the first embodiment of the present invention. As shown in FIG. 3, the antenna selection switch 19 is provided on a rear surface 1A of the TV broadcast receiver 1. A user selects the kind of antenna to use, either the smart antenna 2A or the unidirectional antenna 2B, by sliding the antenna selection switch 19 in either direction as indicated by a double-headed arrow "a". Note that in FIG. 3, the unidirectional antenna is indicated by "Normal Antenna".

Figure 4:
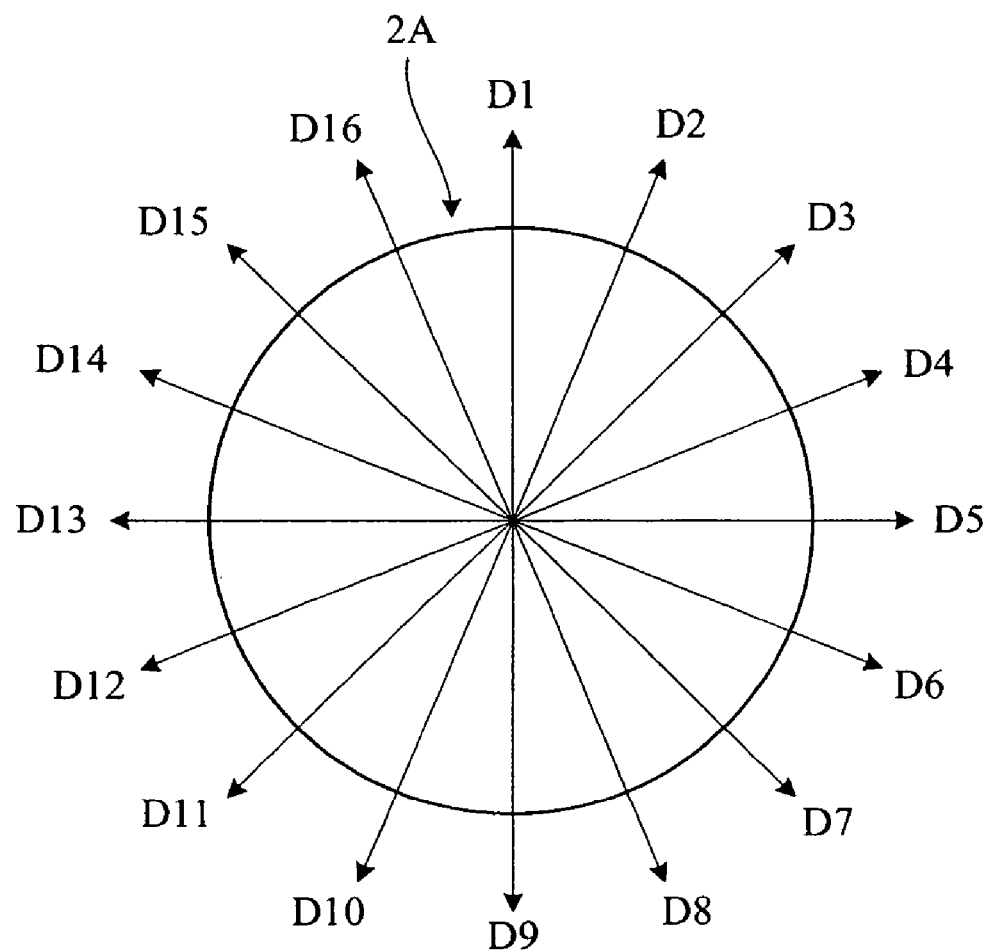
FIG. 4 is a chart showing and explaining multiple receiving directions of a smart antenna connected to the TV broadcast receiver.

FIG. 4 is a chart showing and explaining multiple receiving directions of the smart antenna 2A. When connected to the smart antenna 2A, the TV broadcast receiver 1 according to the present embodiment receives, and measures receiving conditions of, TV broadcast signals coming from sixteen receiving directions provided in the EIA-909 standard as indicated by D1 to D16 in FIG. 4, respectively. The smart antenna 2A comprises: an antenna unit 21 for receiving TV broadcast signals from the sixteen receiving directions D1 to D16 by mechanically or electronically switching an active receiving direction (namely, making one of the multiple receiving directions active); and a control unit 22 for controlling the operation of the antenna unit 21. Based on the receiving direction control signal from the TV broadcast receiver 1, the control unit 22 makes active one of the multiple receiving directions D1 to D16 of the antenna unit 21 which is commanded by the control signal.

Figure 5:
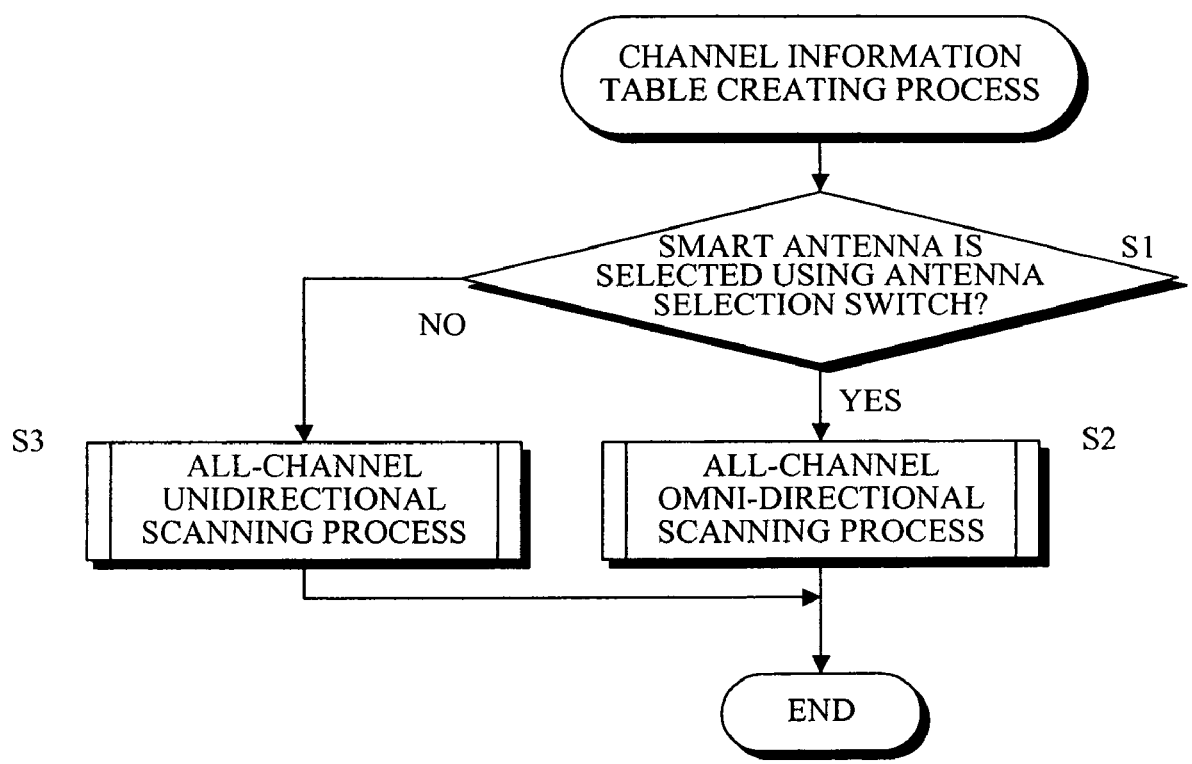
FIG. 5 is a flow chart showing a channel information table creating process performed by the TV broadcast receiver.

Next, referring to the flow chart of FIG. 5, a channel information table creating process for creating a channel information table will be described. When commanded by a user to create a channel information table (or automatically if no channel information table is registered yet), the microprocessor 15 determines whether or not the smart antenna 2A is selected using the antenna selection switch 19 (S1). If the smart antenna 2A is selected using the antenna selection switch 19 (YES in S1), the microprocessor 15 performs a later described all-channel omni-directional scanning process so as to renew a channel information table (example of renewed channel information table being designated by reference numeral 50A in FIG. 8A) (S2). On the other hand, if the unidirectional antenna 2B, not the smart antenna 2A, is selected using the antenna selection switch 19, the microprocessor 15 performs a later described all-channel unidirectional scanning process so as to renew a channel information table (example of renewed channel information table being designated by reference numeral 50B in FIG. 8B) (S3).

Figure 6:
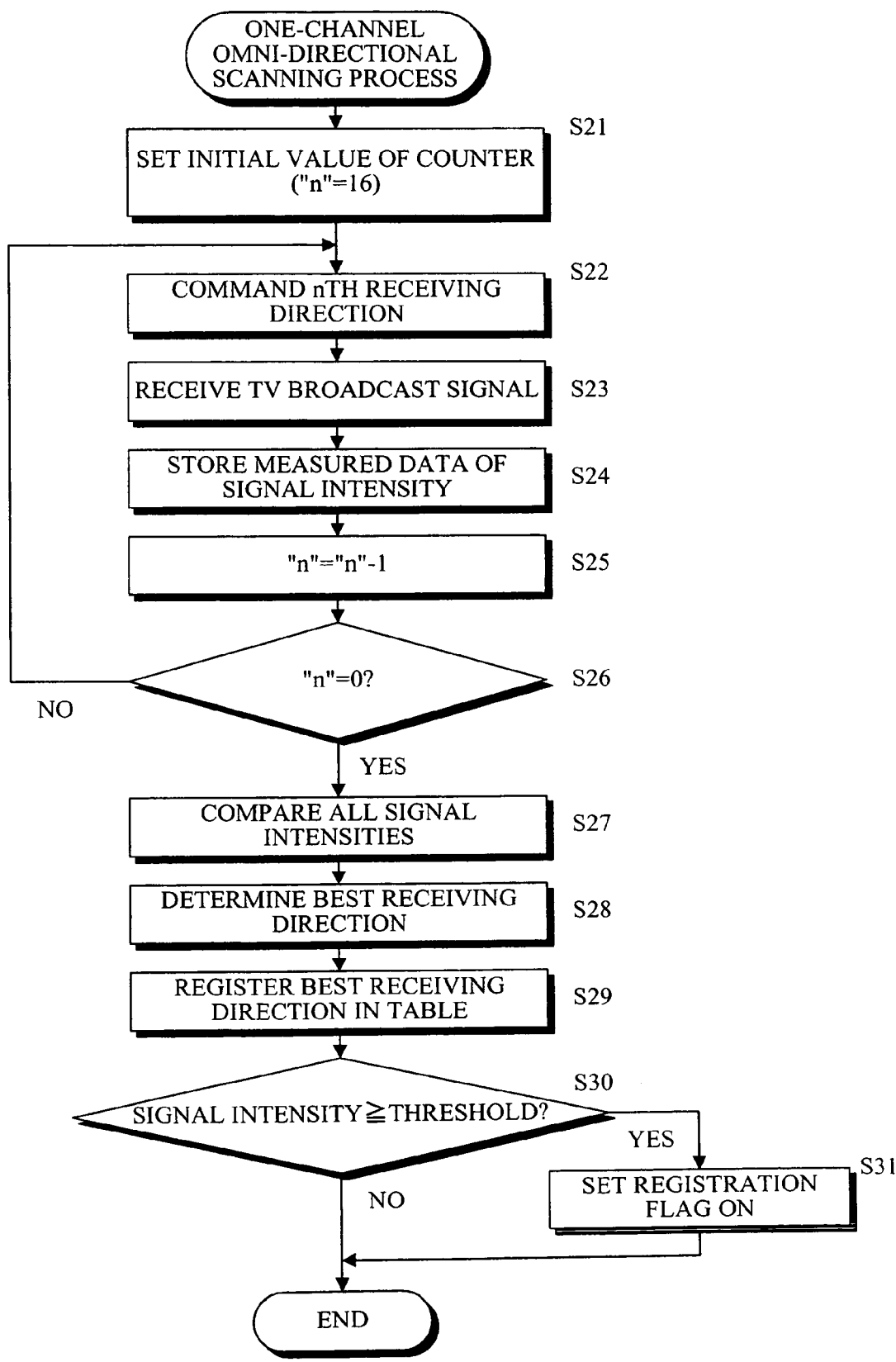
FIG. 6 is a flow chart showing a one-channel omni-directional scanning process performed by the TV broadcast receiver.
Figure 7:
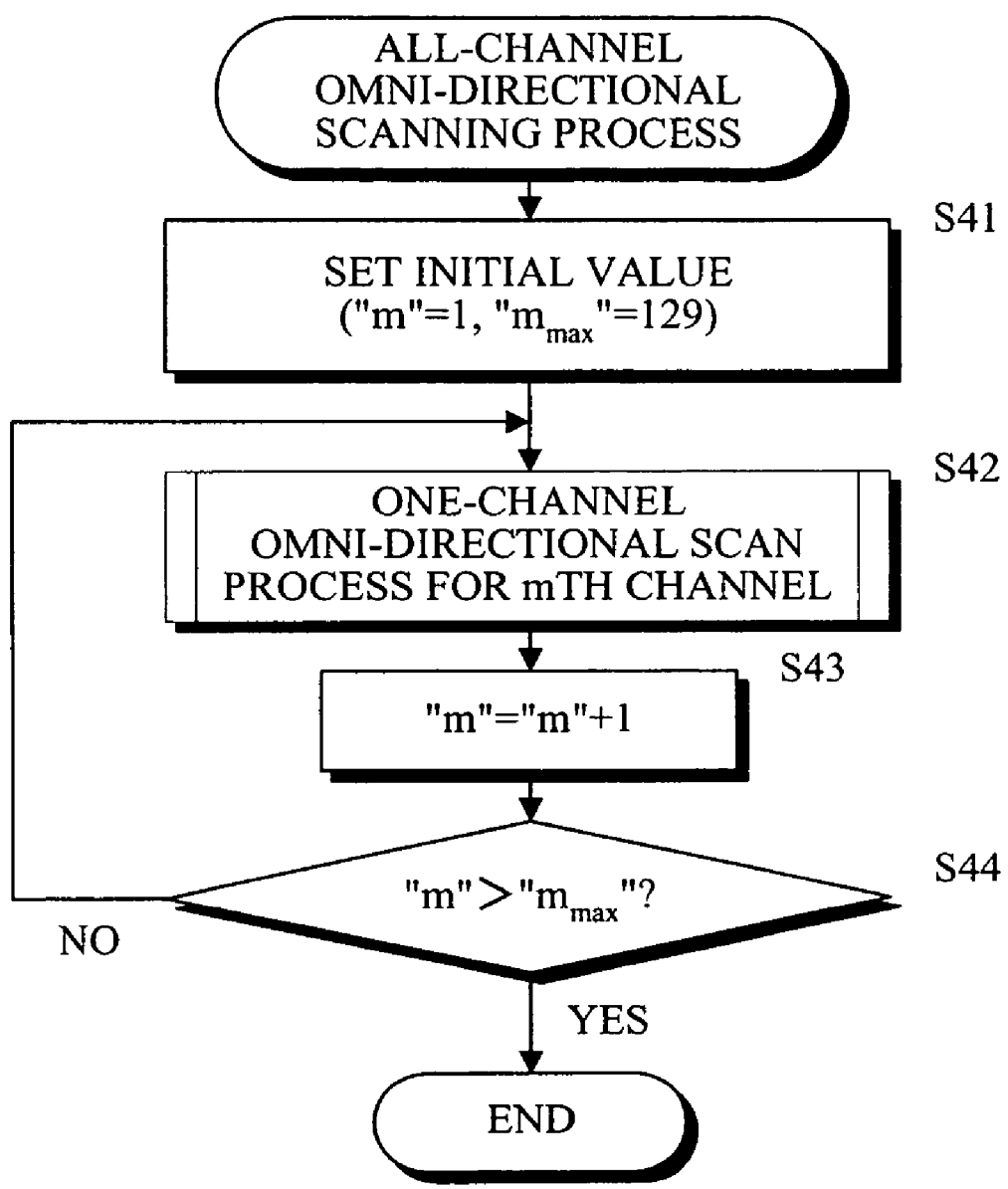
FIG. 7 is a flow chart showing an all-channel omni-directional scanning process performed by the TV broadcast receiver.

Referring now to the flow charts of FIG. 6 and FIG. 7, the following describes a one-channel omni-directional scanning process, and an all-channel omni-directional scanning process, respectively, which the TV broadcast receiver 1 performs in e.g. the step S2 of the channel information table creating process. Before the description of the all-channel omni-directional scanning process to determine best receiving directions for all the channels transmitted from broadcast stations, the one-channel omni-directional scanning process to determine a best receiving direction for one arbitrary selected channel will be described with reference to FIG. 6.

Referring to FIG. 6, when the one-channel omni-directional scanning process starts, the one-channel omni-directional scanning unit 15B sets an initial value n (n being "16") of a counter according to the number of the receiving directions D1 to D16 of the smart antenna 2A (S21). The one-channel omni-directional scanning unit 15B outputs, to the smart antenna 2A via the modular terminal 17, a receiving direction control signal to command an nth receiving direction (S22), so that the tuner 11 receives a TV broadcast signal of the selected channel (S23). The one-channel omni-directional scanning unit 15B commands the tuner 11 to measure the signal intensity of the received TV broadcast signal, and stores the measured data of signal intensity in the memory 16 (S24).

Thereafter, the one-channel omni-directional scanning unit 15B decrements the counter by one (S25), and determines whether or not the tuner 11 has measured signal intensities of the received TV broadcast signal for all the receiving directions of the smart antenna 2A (S26). If the tuner 11 has not measured signal intensities of the TV broadcast signal for all the receiving directions (NO in S26), the one-channel omni-directional scanning unit 15B goes back to the step S22, and commands the tuner 11 to measure the signal intensity or intensities of the TV broadcast signal not having been measured (more specifically measures the signal intensity of the TV broadcast signal for each subsequent receiving direction until completion).

If the tuner 11 completes the measurements of the signal intensities of the TV broadcast signal for all the receiving directions (YES in S26), so that the memory 16 stores all the measured data of signal intensities, the one-channel omni-directional scanning unit 15B reads the measured data stored in the memory 16, and further compares all the read signal intensities (S27), so as to determine a receiving direction to give the maximum signal intensity as a best receiving direction of the received TV broadcast signal (S28), and to further register the best receiving direction for the selected channel in a channel information table (S29). The one-channel omni-directional scanning unit 15B furthermore determines whether or not the signal intensity of the best receiving direction is equal to or higher than a predetermined threshold value (S30). If it is equal to or higher than the predetermined threshold value (YES in S30), the one-channel omni-directional scanning unit 15B sets the registration flag on for the selected channel in the channel information table (S31), thereby ending the process. On the other hand, if the signal intensity of the best receiving direction is lower than the predetermined threshold value (NO in S30), the one-channel omni-directional- scanning unit 15B does not set the registration flag on for the selected channel in the channel information table (namely maintains the off-state of registration flag), thereby ending the process.

Referring now to the flow chart of FIG. 7, the following describes an all-channel omni-directional scanning process, which the TV broadcast receiver 1 performs for determining e.g. a best receiving direction for each of all channels (all receivable channels) transmitted from all broadcast stations. When the all-channel omni-directional scanning process starts, the all-channel omni-directional scanning unit 15C sets, according to the number of channels transmitted from the broadcast stations, an initial value m of a counter as well as a number $m_{max}$ of channels for each of which a best receiving direction is to be determined (S41). By commanding the one-channel omni-directional scanning unit 15B to perform the one-channel omni-directional scanning process described above for an mth channel, the all-channel omni-directional scanning unit 15C in cooperation with the one-channel omni-directional scanning unit 15B determines a best receiving direction and channel registration information for the mth channel, and registers the determined best receiving direction and channel registration information in the channel information table (S42).

Thereafter, the all-channel omni-directional scanning unit 15C increments the counter by one (S43), and determines whether or not the all-channel omni-directional scanning unit 15C itself has completed commanding the one-channel omni-directional scanning unit 15B to perform the one-channel omni-directional scanning process for each of all the channels (S44). If the all-channel omni-directional scanning unit 15C in cooperation with the one-channel omni-directional scanning unit 15B has not completed the one-channel omni-directional scanning process for each of all the channels (NO in S44), the all-channel omni-directional scanning unit 15C goes back to the step 42, and commands the one-channel omni-directional scanning unit 15B to perform the one-channel omni-directional scanning process for the channel or channels not having been subjected to the one-channel omni-directional scanning process (more specifically perform the one-channel omni-directional scanning process for each subsequent channel until completion). If the all-channel omni-directional scanning unit 15C in cooperation with the one-channel omni-directional scanning unit 15B completes the one-channel omni-directional scanning process for each of all the channels so as to determine and register the best receiving direction and channel registration information for each of all the channels in the channel information table (YES in S44), the all-channel omni-directional scanning unit 15C ends the process.

FIG. 8A is a view showing an example of a channel information table 50A created by the above all-channel omni-directional scanning process. The channel information table 50A stores best receiving directions 52 and channel registration information 53 that correspond to channel numbers 51. FIG. 8B will be described separately later. In FIG. 8A and FIG. 8B, each on-state of registration flag is indicated by mark "O", while each off-state of registration flag is indicated by a blank space. Further, respective numbers shown in the column of the best receiving directions 52 correspond to the receiving directions D1 to D16 of the smart antenna 2A shown in FIG. 4 (for example, "2" corresponding to the receiving direction D2, and "3" corresponding to the receiving direction D3).

Figure 9:
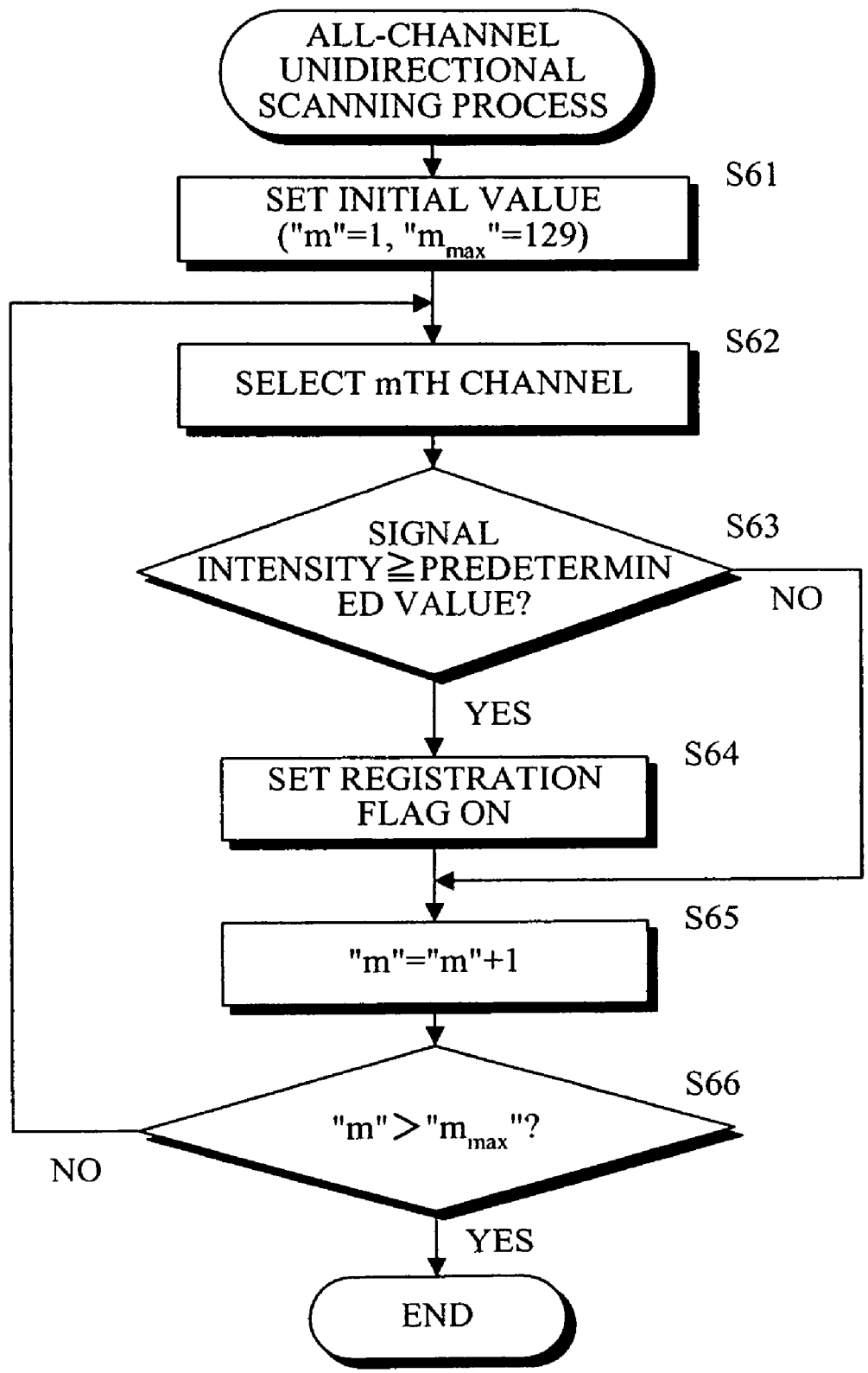
FIG. 9 is a flow chart showing the all-channel unidirectional scanning process.

Now, referring to the flow chart of FIG. 9, the following describes an all-channel unidirectional scanning process which the TV broadcast receiver 1 performs in e.g. the step S3 of the channel information table creating process. When the all-channel unidirectional scanning process starts, the all-channel unidirectional scanning unit 15D sets, according to the number of channels transmitted from the broadcast stations, an initial value m of a counter as well as a number $m_{max}$ of channels for each of which the channel registration information is to be determined (S61). By selecting an mth channel (S62), and commanding the tuner 11 to measure signal intensity of a TV broadcast signal received by the tuner 11 for the selected channel, the all-channel unidirectional scanning unit 15D determines whether or not the signal intensity is equal to or higher than a predetermined value (S63). If the signal intensity of the received TV broadcast signal is equal to or higher than the predetermined value (YES in S63), the all-channel unidirectional scanning unit 15D sets the registration flag on for the selected channel in the channel information table (S64). On the other hand, if the signal intensity of the received TV broadcast signal is lower than the predetermined value (NO in S63), the all-channel unidirectional scanning unit 15D does not set the registration flag on for the selected channel, and maintains the off-state of registration flag in the channel information table.

Thereafter, the all-channel unidirectional scanning unit 15D increments the counter by one (S65), and determines whether or not the all-channel unidirectional scanning unit 15D itself has determined the channel registration information for all the channels (S66). If the all-channel unidirectional scanning unit 15D has not determined the channel registration information for all the channels (NO in S66), the all-channel unidirectional scanning unit 15D goes back to the step S62, and determines the channel registration information for the channel or channels not having been determined (more specifically determines the channel registration information for each subsequent channel until completion). If the all-channel unidirectional scanning unit 15D determines, and registers in the channel information table, the channel registration information for all the channels (YES in S66), the all-channel unidirectional scanning unit 15D ends the process.

FIG. 8B is a view showing an example of a channel information table 50B created by the above all-channel unidirectional scanning process. The channel information table 50B stores channel registration information (registration flags) 53 that correspond to channel numbers 51. It is to be noted here that if the unidirectional antenna 2B is selected using the antenna selection switch 19, the all-channel unidirectional scanning unit 15 does not determine best receiving directions as evident from the above description, and that the reception control unit 15A does not reference the best receiving directions in a later described reception process of receiving a TV broadcast signal in a unidirectional antenna control mode. The data of best receiving directions in this case is meaningless. Thus, the data of best receiving directions is omitted in the channel information table 50B in FIG. 8B. In other words, the channel information table 50B is a table which is the same as the channel information table 50A, but which does not show the data of best receiving directions.

Figure 10:
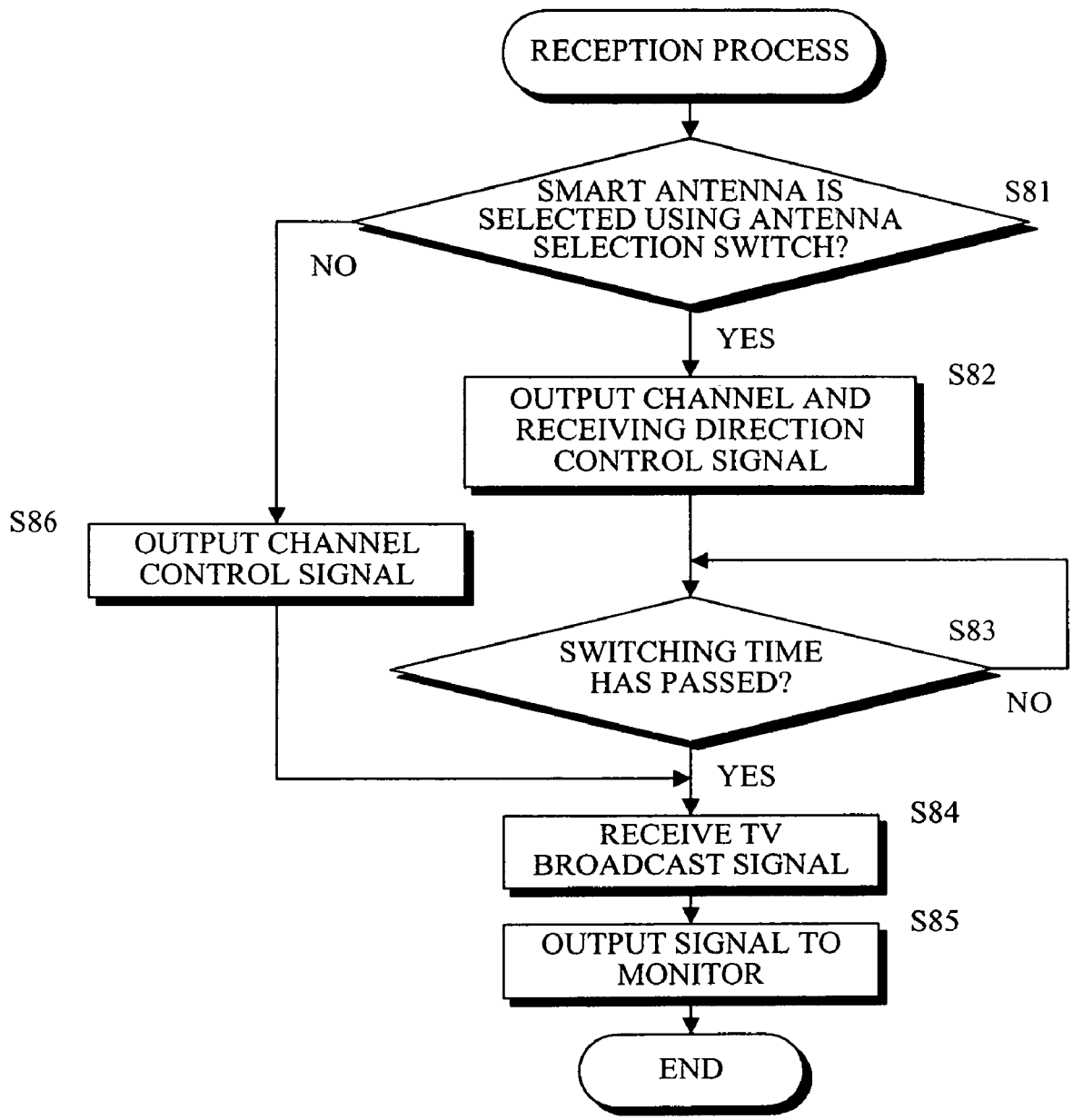
FIG. 10 is a flow chart showing a reception process performed by the TV broadcast receiver for receiving a TV broadcast signal.

Referring now to the flow chart of FIG. 10, the following describes a reception process which the TV broadcast receiver 1, more specifically the reception control unit 15A, performs for receiving a TV broadcast signal when a channel to view is selected by a user. When a user selects a channel to view, the reception control unit 15A determines whether or not the smart antenna 2A is selected using the antenna selection switch 19 (S81). If the smart antenna 2A is selected using the antenna selection switch 19, namely if the kind of antenna selected using the antenna selection switch 19 is the smart antenna 2A (YES in S81), the reception control unit 15A controls the operation of receiving a TV broadcast signal in a smart antenna control mode (multi-directional antenna control mode) (S82 to S85) as will be described below. On the other hand, if the unidirectional antenna 2B is selected using the antenna selection switch 19 (NO in S81), the reception control unit 15A controls the operation of receiving a TV broadcast signal in a unidirectional antenna control mode (S86, S84 and S85) as will also be described below.

In the smart antenna control mode, the reception control unit 15A references the channel information table 50A to receive a channel selected by the user, and outputs a channel control signal to the tuner 11 and a receiving direction control signal to the smart antenna 2A via the modular terminal 17 on the basis of the channel information table 50A (S82), and determines whether a predetermined receiving direction switching time has passed (S83). After the predetermined receiving direction switching time (YES in S83), the reception control unit 15A commands the tuner 11 to receive a TV broadcast signal of the selected channel (S84), and outputs the received TV broadcast signal to the monitor 3 (S85), thereby ending the reception process.

On the other hand, in the unidirectional antenna control mode, the reception control unit 15A references the channel information table 50B to receive a channel selected by the user, and outputs a channel control signal to the tuner 11 on the basis of the channel information table 50B (S86), and commands the tuner 11 to receive a TV broadcast signal of the selected channel (S84), and further outputs the received TV broadcast signal to the monitor 3 (S85), thereby ending the reception process. Thus, the reception control unit 15A starts commanding the tuner 11 to receive the TV broadcast signal and outputting the received TV broadcast signal to the monitor 3 without waiting for the receiving direction switching time, because it is not necessary (it is not possible) to switch the receiving direction of the antenna, if the antenna selected using the antenna selection switch 19 is the unidirectional antenna 2B.

As described in the foregoing, the TV broadcast receiver 1 according to the first embodiment of the present invention comprises an antenna selection switch 19 to be operated by a user for selecting either a smart antenna 2A or a unidirectional antenna 2B as an antenna to be connected to the tuner 11. The TV broadcast receiver 1 (reception control unit 15A) switches its control mode between a unidirectional antenna control mode and a smart antenna (multi-directional antenna) control mode. More specifically, if the unidirectional antenna 2B is selected using the antenna selection switch 19, the TV broadcast receiver 1 (reception control unit 15A) switches its control mode to the unidirectional control mode in which the reception control unit 15A outputs a channel control signal to the tuner 11 for controlling the reception of a TV broadcast signal. On the other hand, if the smart antenna 2A is selected using the antenna selection switch 19, the TV broadcast receiver 1 (reception control unit 15A) switches its control mode to the smart antenna control mode in which the reception control unit 15A outputs a channel control signal and a receiving direction control signal to the tuner 11 and the smart antenna 2A, respectively, for controlling the reception of a TV broadcast signal. Thus, it is possible according to the TV broadcast receiver 1 of the present embodiment to properly switch the antenna control mode, depending on the kind of antenna selected by the user.

Furthermore, the TV broadcast receiver 1 according to the present embodiment renews a channel information table by performing a one-channel omni-directional scanning process or an all-channel omni-directional scanning process, if the smart antenna 2A is selected using the antenna selection switch 19. On the other hand, the TV broadcast receiver 1 according to the present embodiment renews the channel information table by performing an all-channel unidirectional scanning process, if the unidirectional antenna 2B is selected using the antenna selection switch 19. Thus, it is possible according to the TV broadcast receiver 1 of the present embodiment to properly perform a process of renewing the channel information table, depending on the kind of antenna selected by the user.

Hereinafter, a TV broadcast receiver according to a second embodiment of the present invention will be described. The TV broadcast receiver according to the second embodiment is basically the same as the TV broadcast receiver according to the first embodiment of the present invention, except that the TV broadcast receiver of the second embodiment uses software, in place of the antenna selection switch as used in the first embodiment, and further uses elements and functions related to the software. Thus, the following mainly contains descriptions of parts and elements in the second embodiment which are different from those in the first embodiment, while descriptions of parts and elements which are similar to those in the first embodiment are mostly omitted for convenience.

Figure 11:
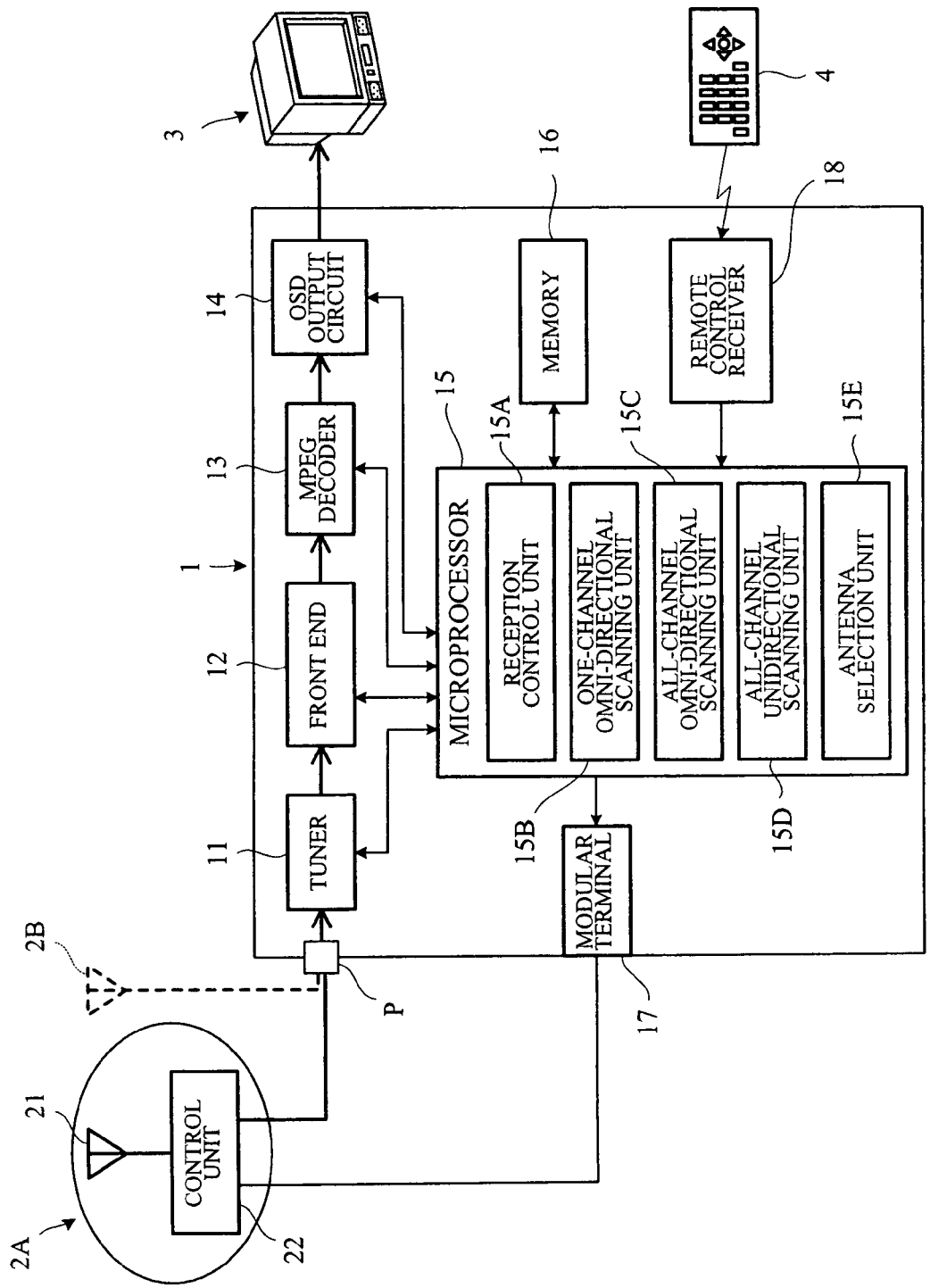
FIG. 11 is a schematic block diagram showing a TV broadcast receiver according to a second embodiment of the present invention.

FIG. 11 is a schematic block diagram showing a TV broadcast receiver 1 according to the second embodiment of the present invention. As shown in FIG. 11, the TV broadcast receiver 1 according to the second embodiment is basically the same as the TV broadcast receiver 1 according to the first embodiment of the present invention, except that TV broadcast receiver 1 of the second embodiment uses software, in place of the antenna selection switch 19 as used in the first embodiment, to select the kind of antenna to be connected to a tuner 11, more specifically uses an antenna selection unit 15E provided in a microprocessor 15, as will be described below.

According to the second embodiment, the microprocessor 15 comprises an antenna selection unit 15E which outputs, to a monitor 3, an antenna selection image for a user to select either a smart antenna 2A or a unidirectional antenna 2B as an antenna to be connected to the tuner 11 so as to accept input of antenna selection by the user, and which further sets the kind of antenna selected by the user as the kind of antenna to be connected to the tuner 11. An OSD output circuit 14 superimposes, on a video signal contained in a TV broadcast signal, an antenna selection image for a user to select the kind of antenna in a later described antenna selection process so as to produce a combined signal, and outputs the combined signal to the monitor 3. A memory 16 stores an antenna management file for managing setting of an antenna connected to the tuner 11. The antenna management file at least contains information to identify the kind of antenna used and connected to the tuner 11 (such antenna being hereafter referred to as "used antenna"). Based on this information, the microprocessor 15 controls the used antenna connected to the tuner 11.

Figure 12:
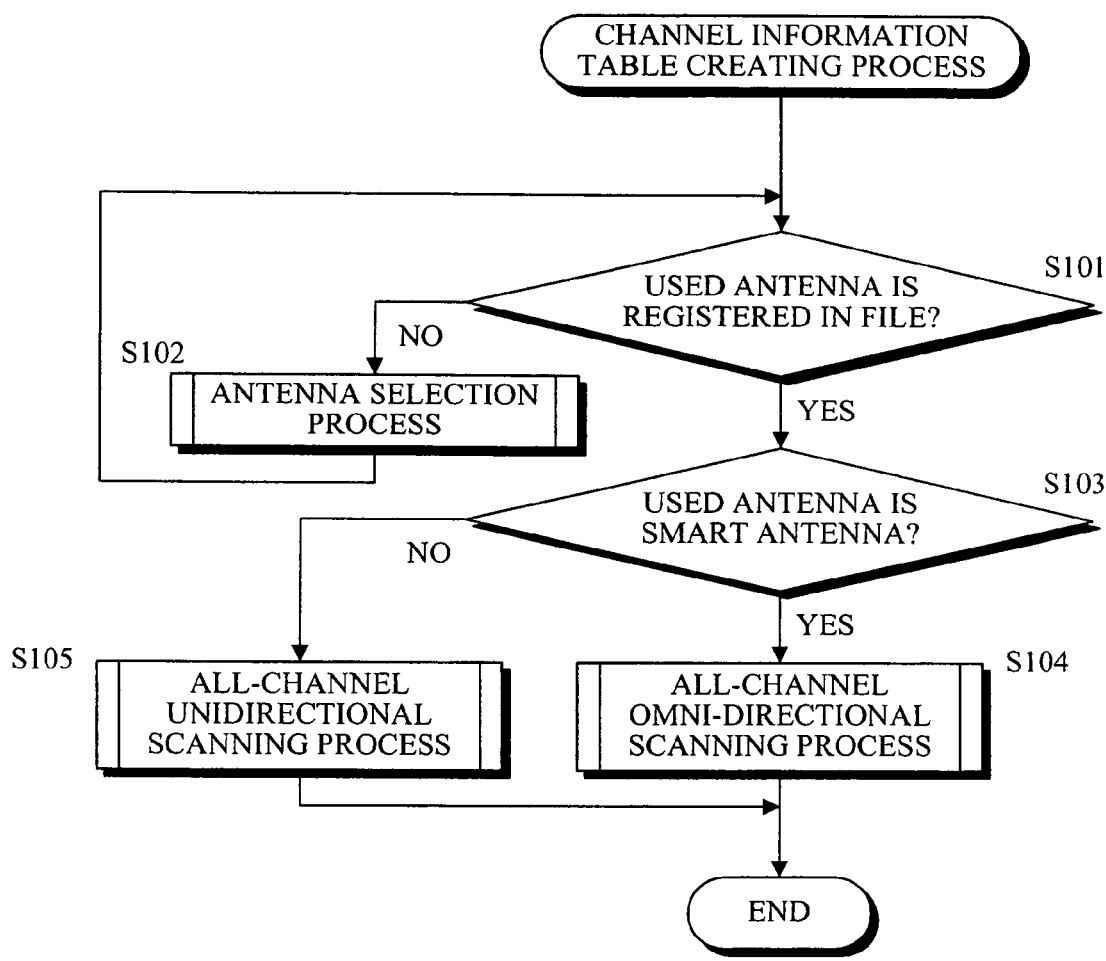
FIG. 12 is a flow chart showing a channel information table creating process performed by the TV broadcast receiver.

Next, referring to the flow chart of FIG. 12, a channel information table creating process for creating a channel information table will be described. When commanded by a user to create a channel information table (or automatically if no channel information table is registered yet), the microprocessor 15 determines whether or not a used antenna is registered in an antenna management file (S101). If a used antenna is not registered in the antenna management file (NO in S101), the microprocessor 15 performs a later described antenna selection process so as to register the kind of used antenna connected to the tuner 11 in the antenna management file (S102).

On the other hand, if a used antenna is registered in the antenna management file (YES in S101), the microprocessor 15 determines whether or not the used antenna registered therein is a smart antenna 2A (S103). If the used antenna registered therein is the smart antenna 2A (YES in S 103), the microprocessor 15 performs an all-channel omni-directional scanning process as described above in the first embodiment so as to renew a channel information table (example of renewed channel information table being designated by reference numeral 50A in FIG. 8A) (S104). On the other hand, if the used antenna registered therein is a unidirectional antenna 2B, not a smart antenna 2A, the microprocessor 15 performs an all-channel unidirectional scanning process as described above in the first embodiment so as to renew the channel information table (example of renewed channel information table being designated by reference numeral 50B in FIG. 8B) (S105).

Figure 13:
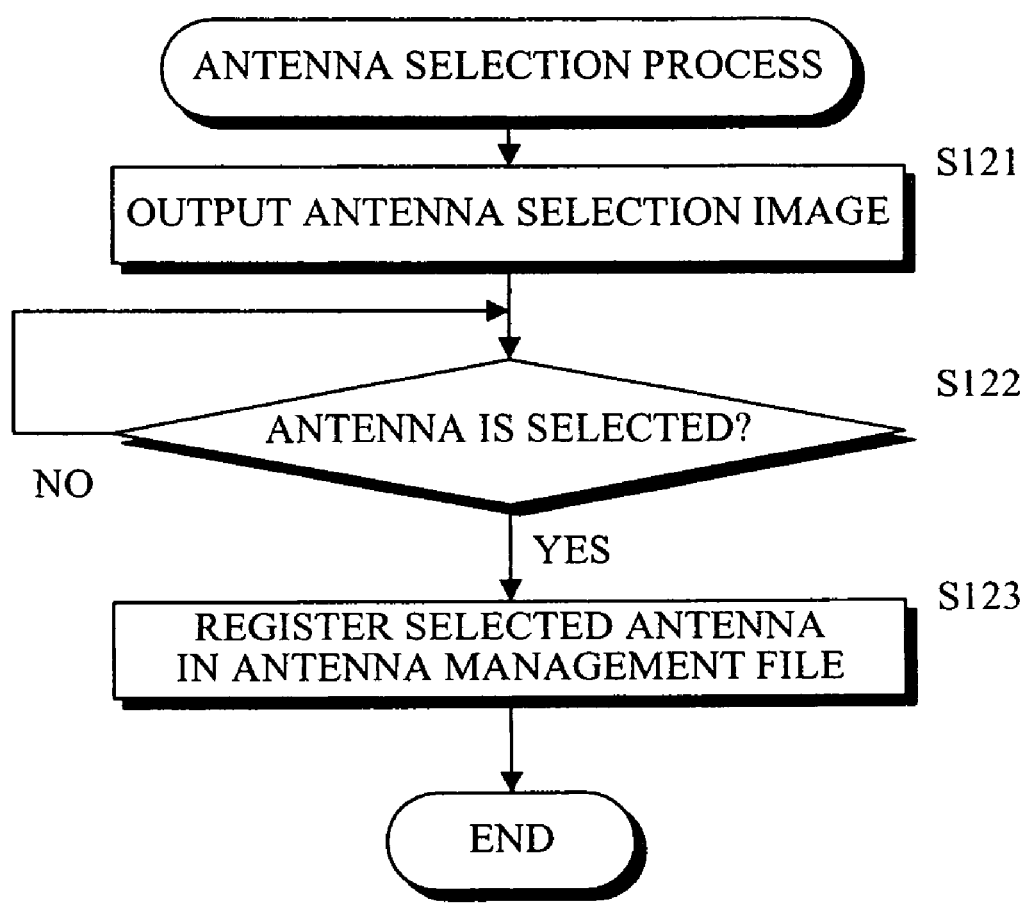
FIG. 13 is a flow chart showing an antenna selection process performed by the TV broadcast receiver.
Figure 14:
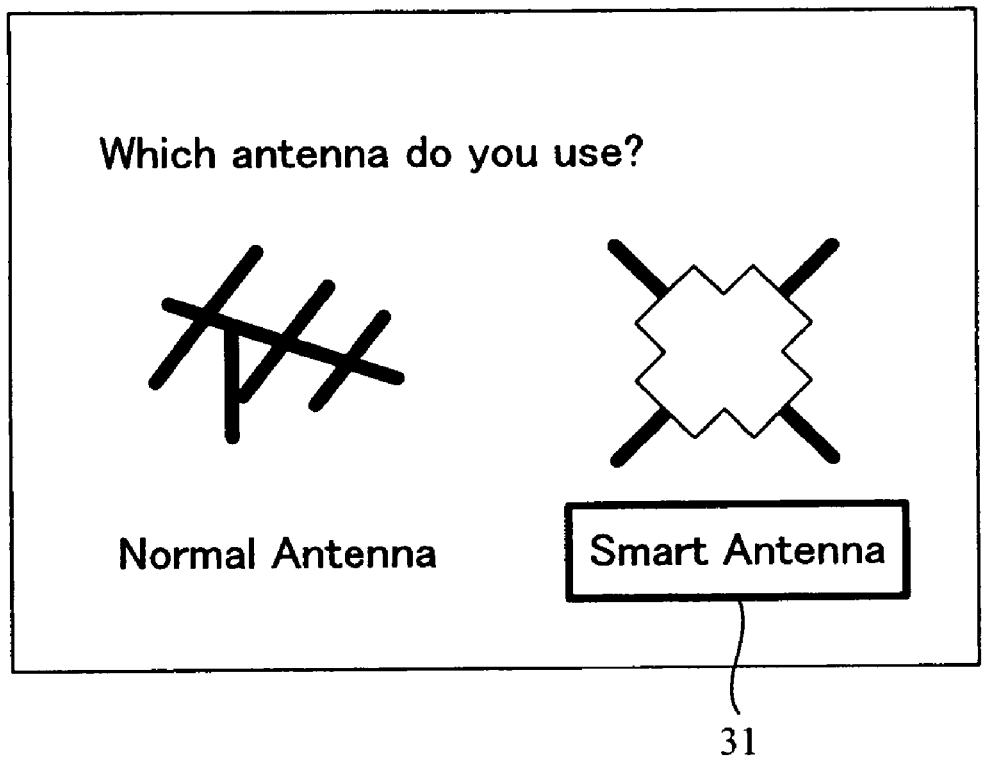
FIG. 14 is a schematic view showing a monitor screen for the antenna selection process.

Next, an antenna selection process according to the second embodiment of the present invention will be described with reference to FIG. 13 which shows a flow chart of the antenna selection process, and to FIG. 14 which shows a monitor screen for the antenna selection process. Referring to FIG. 13, when an antenna selection process starts, the antenna selection unit 15E outputs an antenna selection image on a monitor screen 30 of the monitor 3 as shown in FIG. 14 (S121). The antenna selection unit 15E then determines whether an antenna, or the kind of antenna, to be used is selected by a user (S122). If the antenna is selected (YES in S122), either a smart antenna 2A or a unidirectional antenna 2B, the antenna selection unit 15E registers the thus selected kind of antenna in the antenna management file as the used antenna (S123), thereby ending the process. Note that in FIG. 14, the unidirectional antenna 2B is indicated by "Normal Antenna". By operating a cursor 31, the user selects one of the smart antenna 2A and the unidirectional antenna 2B (Normal Antenna).

Figure 15:
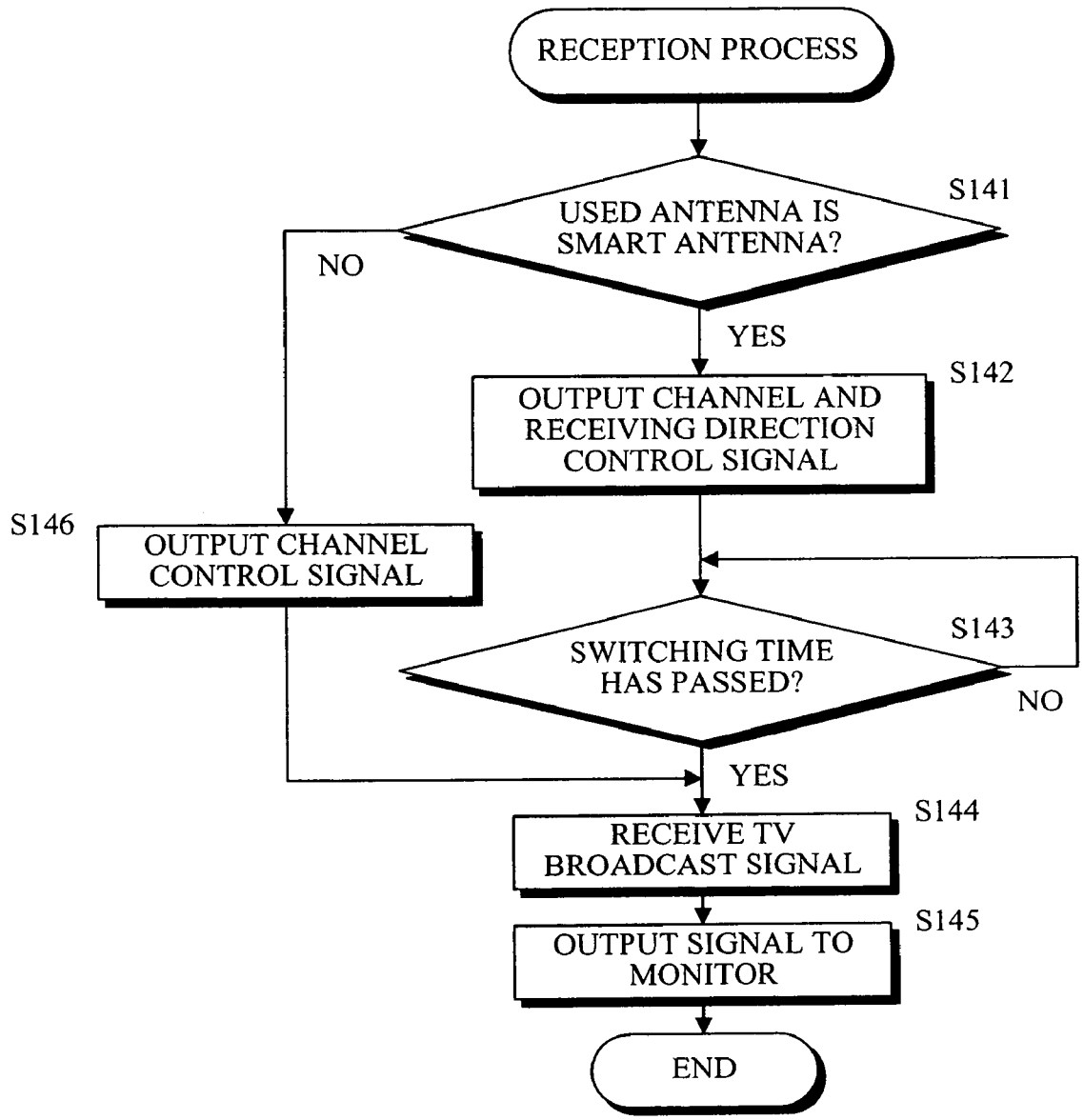
FIG. 15 is a flow chart showing a reception process performed by the TV broadcast receiver for receiving a TV broadcast signal.

Referring now to the flow chart of FIG. 15, the following describes a reception process which the TV broadcast receiver 1, more specifically a reception control unit 15A, according to the second embodiment of the present invention performs for receiving a TV broadcast signal when a channel to view is selected by a user. When a user selects a channel to view, the reception control unit 15A references the antenna management file to receive the selected channel, more specifically to determine whether or not the used antenna is the smart antenna 2A (S141). If the used antenna is the smart antenna 2A (YES in S141), the reception control unit 15A references the channel information table 50A to receive a channel selected by the user, and controls the operation of receiving a TV broadcast signal on the basis of the channel information table 50A in a smart antenna control mode (multi-directional antenna control mode) (S142 to S145) similar to the smart antenna control mode (S82 to S85) as described above in the first embodiment. On the other hand, if the used antenna is the unidirectional antenna 2B (NO in S141), the reception control unit 15A references the channel information table 50B to receive a channel selected by the user, and controls the operation of receiving a TV broadcast signal on the basis of the channel information table 50B in a unidirectional antenna control mode (S146, S144 and S145) similar to the unidirectional antenna control mode (S86, S84 and S85) as also described above in the first embodiment.

As described in the foregoing, the TV broadcast receiver 1 according to the second embodiment of the present invention comprises an antenna selection unit 15E to be operated by a user for selecting either a smart antenna 2A or a unidirectional antenna 2B as an antenna to be connected to the tuner 11. The TV broadcast receiver 1 (reception control unit 15A) switches its control mode between a unidirectional antenna control mode (multi-directional antenna) control mode. More specifically, if the unidirectional antenna 2B is selected by the antenna selection unit 15E (namely if the unidirectional antenna is registered in an antenna management file as a used antenna), the TV broadcast receiver 1 (reception control unit 15A) switches its control mode to the unidirectional control mode in which the reception control unit 15A outputs a channel control signal to the tuner 11 for controlling the reception of a TV broadcast signal. On the other hand, if the smart antenna 2A is selected by the antenna selection unit 15E (namely if the smart antenna is registered in the antenna management file as the used antenna), the TV broadcast receiver 1 (reception control unit 15A) switches its control mode to the smart antenna control mode in which the reception control unit 15A outputs a channel control signal and a receiving direction control signal to the tuner 11 and the smart antenna 2A, respectively, for controlling the reception of a TV broadcast signal. Thus, it is possible according to the TV broadcast receiver 1 of the second embodiment to properly switch the antenna control mode, depending on the kind of antenna selected by the user.

Furthermore, the TV broadcast receiver 1 according to the second embodiment renews a channel information table by performing a one-channel omni-directional scanning process or an all-channel omni-directional scanning process, if the smart antenna 2A is selected by the antenna unit 15E. On the other hand, the TV broadcast receiver 1 according to the second embodiment renews the channel information table by performing an all-channel unidirectional scanning process, if the unidirectional antenna 2B is selected by the antenna selection unit 15E. Thus, it is possible according to the TV broadcast receiver 1 of the second embodiment to properly perform a process of renewing a channel information table, depending on the kind of antenna selected by the user. Furthermore, when a user selects the kind of antenna to be connected to the tuner 11, an antenna selection image for selecting the kind of antenna is output on a monitor screen 30 of the monitor 3 by being superimposed on a video signal contained in a TV broadcast signal. Accordingly, the user can easily select the kind of antenna by watching the monitor screen 30.

Figure 16A:
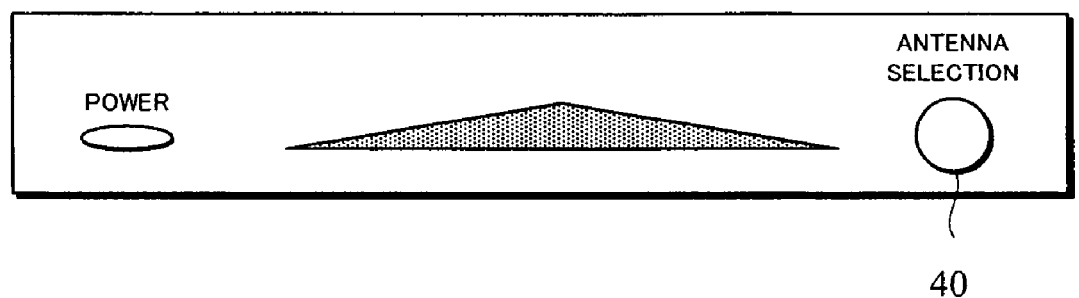
Figure 16B:
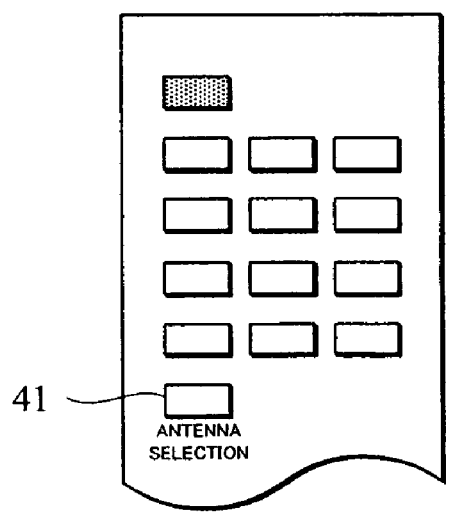

It is to be noted that the present invention is not limited to the above embodiments, and various modifications are possible. For example, in place of the antenna selection switch 19 or the antenna selection unit 15E, the TV broadcast receiver 1 can be modified to have an antenna selection button 40 provided on a front surface 1B thereof as shown in FIG. 16A, or an antenna selection button 41 provided on the remote control 4 as shown in FIG. 16B in a manner that a user selects the kind of antenna to be connected to the tuner 11, using the antenna selection button 40 or 41, and that the kind of selected antenna is registered in an antenna management file as a used antenna, whereby the TV broadcast receiver 1 discriminates the kind of used antenna on the basis of the antenna management file for controlling the reception of a TV broadcast signal. Furthermore, TV broadcast signals which the TV broadcast receiver 1 can receive are not limited to digital television broadcast signals, but can be analog television broadcast signals. In addition, the number of receiving directions of the smart antenna 2A is not limited to sixteen as exemplified in the above embodiments, but can be another number such as four or eight.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A television broadcast receiver connected to a unidirectional antenna having a single receiving direction, or to a multi-directional antenna having a predetermined number of receiving directions, for receiving television broadcast signals in respective channels transmitted from broadcast stations, the television broadcast receiver comprising:

a tuner connected to the unidirectional antenna or the multi-directional antenna for receiving a television broadcast signal;

a reception control unit for outputting, to the tuner, a channel control signal to command a channel to be selected, and for outputting, to the multi-directional antenna, a receiving direction control signal to command a receiving direction for receiving the television broadcast signal, so as to control a reception process of receiving the television broadcast signal; and an antenna selection switch to be operated by a user for selecting either the unidirectional antenna or the multi-directional antenna to be connected to the tuner;

wherein the reception control unit switches a control mode between a unidirectional antenna control mode and a multi-directional antenna control mode in a manner that if the unidirectional antenna is selected using the antenna selection switch, the reception control unit switches the control mode to the unidirectional control mode in which the reception control unit outputs the channel control signal to the tuner for controlling the reception of the television broadcast signal, while if the multi-directional antenna is selected using the antenna selection switch, the reception control unit switches the control mode to the multi-directional antenna control mode in which the reception control unit outputs the channel control signal and the receiving direction control signal to the tuner and the multi-directional antenna, respectively, for controlling the reception of the television broadcast signal.

2. The television broadcast receiver according to claim 1, which further comprises:

a memory for storing a channel information table to contain channel numbers of the respective channels transmitted from the broadcast stations, and to further contain best receiving directions of the multi-directional antenna for receiving the respective channels, and to still further contain channel registration information indicating whether the respective channels are registered as selectable channels or as non-selectable channels in the channel information table, in which the reception control unit references the channel information table to receive a channel selected by the user;

a one-channel omni-directional scanning unit for performing a one-channel omni-directional scanning process which includes commanding the reception control unit to sequentially output, to the multi-directional antenna when selected using the antenna selection switch, the receiving direction control signal so as to sequentially command the respective receiving directions of the multi-directional antenna, and which further includes commanding the tuner to sequentially receive television broadcast signals in the respective receiving directions for arbitrary one channel transmitted from a broadcast station so as to determine a best receiving direction and channel registration information for the one channel on the basis of signal intensities of the television broadcast signals in the respective receiving directions, and renew the channel information table on the basis of the determined best receiving direction and channel registration information;

an all-channel omni-directional scanning unit for commanding the one-channel omni-directional scanning unit to repeat the one-channel omni-directional scanning process for the respective channels transmitted from the broadcast stations, when the multi-directional antenna is selected using the antenna selection switch, so as to determine a best receiving direction and channel registration information for each of the respective channels, and renew the channel information table on the basis of the determined best receiving direction and channel registration information; and an all-channel unidirectional scanning unit for commanding the reception control unit to sequentially output, to the tuner, the channel control signal so as to sequentially command selection of the respective channels from the broadcast stations, and further for commanding the tuner to sequentially receive television broadcast signals of the respective channels, when the unidirectional antenna is selected using the antenna selection switch, so as to determine channel registration information for each of the respective channels, and renew the channel information table on the basis of the determined channel registration information.

3. A television broadcast receiver connected to a unidirectional antenna having a single receiving direction, or to a multi-directional antenna having a predetermined number of receiving directions, for receiving television broadcast signals in respective channels transmitted from broadcast stations, the television broadcast receiver comprising:

a tuner connected to the unidirectional antenna or the multi-directional antenna for receiving a television broadcast signal;

a reception control unit for outputting, to the tuner, a channel control signal to command a channel to be selected, and for outputting, to the multi-directional antenna, a receiving direction control signal to command a receiving direction for receiving the television broadcast signal, so as to control a reception process of receiving the television broadcast signal; and an antenna selection unit for outputting, to a monitor, an antenna selection image for a user to select either the multi-directional antenna or the unidirectional antenna to be connected to the tuner so as to accept input of antenna selection by the user, and for further setting the antenna selected by the user as the antenna to be connected to the tuner, wherein the reception control unit switches a control mode between a unidirectional antenna control mode and a multi-directional antenna control mode in a manner that if the unidirectional antenna is selected by the antenna selection unit, the reception control unit switches the control mode to the unidirectional control mode in which the reception control unit outputs a channel control signal to the tuner for controlling the reception of the television broadcast signal, while if the multi-directional antenna is selected by the antenna selection unit, the reception control unit switches the control mode to the multi-directional antenna control mode in which the reception control unit outputs the channel control signal, and the receiving direction control signal to the tuner and the multi-directional antenna, respectively, for controlling the reception of the television broadcast signal.

4. The television broadcast receiver according to claim 3, which further comprises:

a memory for storing a channel information table to contain channel numbers of the respective channels transmitted from the broadcast stations, and to further contain best receiving directions of the multi-directional antenna for receiving the respective channels, and to still further contain channel registration information indicating whether the respective channels are registered as selectable channels or as non-selectable channels in the channel information table, in which the reception control unit references the channel information table to receive a channel selected by the user;

a one-channel omni-directional scanning unit for performing a one-channel omni-directional scanning process which includes commanding the reception control unit to sequentially output, to the multi-directional antenna when selected by the antenna selection unit, the receiving direction control signal so as to sequentially command the respective receiving directions of the multi-directional antenna, and which further includes commanding the tuner to sequentially receive television broadcast signals in the respective receiving directions for arbitrary one channel transmitted from a broadcast station so as to determine a best receiving direction and channel registration information for the one channel on the basis of signal intensities of the television broadcast signals in the respective receiving directions, and renew the channel information table on the basis of the determined best receiving direction and channel registration information;

an all-channel omni-directional scanning unit for commanding the one-channel omni-directional scanning unit to repeat the one-channel omni-directional scanning process for the respective channels transmitted from the broadcast stations, when the multi-directional antenna is selected by the antenna selection unit, so as to determine a best receiving direction and channel registration information for each of the respective channels, and renew the channel information table on the basis of the determined best receiving direction and channel registration information; and an all-channel unidirectional scanning unit for commanding the reception control unit to sequentially output, to the tuner, the channel control signal so as to sequentially command selection of the respective channels from the broadcast stations, and further for commanding the tuner to sequentially receive television broadcast signals of the respective channels, when the unidirectional antenna is selected by the antenna selection unit, so as to determine channel registration information for each of the respective channels, and renew the channel information table on the basis of the determined channel registration information.

* * * * *